United States Patent [19]

Mizrahi

[11] Patent Number: 5,748,349
[45] Date of Patent: May 5, 1998

[54] GRATINGS-BASED OPTICAL ADD-DROP MULTIPLEXERS FOR WDM OPTICAL COMMUNICATION SYSTEM

[75] Inventor: Victor Mizrahi, Columbia, Md.

[73] Assignee: Ciena Corp., Linthicum, Md.

[21] Appl. No.: 622,957

[22] Filed: Mar. 27, 1996

[51] Int. Cl.[6] .................................................. H04J 14/02
[52] U.S. Cl. ............................................. 359/130; 385/37
[58] Field of Search .............................. 359/130; 385/18, 385/24, 37

[56] References Cited

U.S. PATENT DOCUMENTS

| | | | |
|---|---|---|---|
| 5,212,578 | 5/1993 | Grimes et al. | 359/124 |
| 5,283,686 | 2/1994 | Huber | 359/337 |
| 5,457,760 | 10/1995 | Mizrahi | 385/37 |
| 5,467,212 | 11/1995 | Huber | 359/168 |
| 5,475,780 | 12/1995 | Mizrahi | 385/37 |
| 5,541,766 | 7/1996 | Mizrahi et al. | 359/337 |
| 5,633,741 | 5/1997 | Giles | 359/124 |

OTHER PUBLICATIONS

Jones et al., *Electronics Letters*, vol. 31, No. 24, 23 Nov. 1995, pp. 2117–2118.

Chawki et al., *Electronics Letters*, vol. 31, No. 6, 16 Mar. 1995, pp. 476–477.

Giles and Mizrahi, *IOOC Tech. Digest*, Jun. 26, 1995, pp. 66–67.

Guy et al., *Electronics Letters*, vol. 30, No. 18, Sep. 1994, pp. 1512–1513.

Morey et al., *Optics & Photonics News*, Feb., 1994, pp. 9–14.

Farries et al., *Electronics Letters*, vol. 30, No. 11, 26 May 1994, pp. 891–892.

*Primary Examiner*—Leslie Pascal
*Attorney, Agent, or Firm*—Margaret Burke

[57] ABSTRACT

The present invention provides a gratings-based add-drop multiplexer in which plural optical channels can be added and/or dropped by the same optical device in a manner which avoids transmitting an optical channel through a radiation mode loss region of a Bragg grating. In one embodiment, the add-drop multiplexer comprises a three-port optical circulator, an optical coupler, and a transmission path communicating with both the circulator and the optical coupler. A set of one more Bragg gratings is positioned in the transmission path for reflected signals to be dropped towards the circulator and onto a "drop" path. The through optical signals enter the first coupler input port and are combined with the "add" signals transmitted by the second coupler input port. The coupler optically combines these optical signals and outputs the combined optical signal. Advantageously, the optical signals added by the add-drop multiplexer are not reflected by the set of gratings which are used to drop optical channels, avoiding any problems with transmission through the radiation mode loss region of a grating. Further, because the "add" optical signals are not reflected by the gratings set, the add-drop multiplexer can be used asymmetrically, i.e., more optical channels can be added than are dropped.

13 Claims, 2 Drawing Sheets

5,748,349

GRATINGS-BASED OPTICAL ADD-DROP MULTIPLEXERS FOR WDM OPTICAL COMMUNICATION SYSTEM

FIELD OF THE INVENTION

The invention relates to wavelength division multiplexed optical communication systems and, more particularly, to wavelength division multiplexed optical communication systems which include Bragg gratings-based add-drop multiplexers for transferring selected optical channels between optical paths within the optical system.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portion collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. A WDM system employs plural optical signal channels, each channel being assigned a particular channel wavelength. In a WDM system, optical signal channels are generated, multiplexed to form an optical signal comprised of the individual optical signal channels, transmitted over a single waveguide, and demultiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems.

In many applications, such as optical LANs, cable television subscriber systems, and telecommunications networks, there is a need to route one or more channels of a multiplexed optical signal to different destinations. Such routing occurs when optical channels are sent to or withdrawn from an optical transmission line e.g., for sending optical channels between a terminal and an optical bus or routing long distance telecommunications traffic to individual cities. This form of optical routing is generally referred to as "add-drop multiplexing."

One approach to add-drop multiplexing is explored in Giles and Mizrahi, "Low-Loss ADD/DROP Multiplexers for WDM Lightwave Networks," *IOOC Technical Digest*, (The Chinese University Press, Hong Kong) c. 1995, pp. 65–67, the disclosure of which is incorporated herein by reference. In this paper, an add-drop multiplexer is proposed which uses two three-port optical circulators with a narrowband fiber grating positioned between the two optical circulators. Using this configuration, an optical signal to be dropped from an optical transmission path is reflected by the narrowband fiber grating and exits through the drop port of the optical circulator. All other input signals exit via the through port of the optical circulator. Similarly, an optical signal to be added which has a wavelength nominally identical to the optical signal being dropped from the optical transmission path is input to the add port of the second circulator. The signal to be added to the optical transmission path is reflected towards the through port of the second circulator by the same narrowband fiber grating used for signal dropping.

While the disclosed add/drop multiplexers are useful for dropping and adding a single optical channel, problems arise when it is desirable to simultaneously drop or add more than one optical channel. In the system depicted in the cited paper, add-drop multiplexing of more than one optical channel is accomplished through use of sequential add/drop multiplexers, each having a narrowband fiber grating configured to reflect a different wavelength. Although this permits the add-dropping of plural channels, this configuration is costly and adds substantial additional loss to the system.

To reduce the need for plural add-drop multiplexers, plural gratings can be positioned between the two circulators of a single add-drop multiplexer. However, if more than one narrowband fiber grating were positioned between the circulators in the disclosed add-drop multiplexer, one or more optical channels are potentially transmitted through the radiation mode loss region of at least one grating. As is known in the art, strong fiber gratings, i.e., gratings which reflect over 95% of the incident design wavelength, generally include a significant radiation mode loss band on the short wavelength side of the transmission spectrum. See, for example, U.S. Pat. Nos. 5,457,760 and 5,475,780 to Mizrahi, the disclosures of which are incorporated by reference herein. The expression "radiation mode loss" describes any optical signal loss due to scattering outside the core of the waveguide, including radiation scattered in the cladding of the waveguide, and is caused by the grating presence within the core, and not the cladding, of the optical waveguide. Consequently, it is desirable to ensure that optical signals do not pass through the radiation mode loss region of an optical grating. This can be a significant problem in WDM systems with plural optical channels.

In the add-drop multiplexer of the cited paper, if more than one fiber grating were positioned between the circulators, either the optical signals which are dropped or the optical signals which are added could be transmitted through the radiation mode loss region of at least one grating. An optical add-drop multiplexer with three fiber gratings positioned between two three-port optical circulators is depicted in FIG. 1. In the configuration of FIG. 1, the three fiber gratings are configured to reflect wavelengths of $\lambda_1$, $\lambda_2$, and $\lambda_3$ where $\lambda_1 < \lambda_2 < \lambda_3$ for dropping and adding optical channels corresponding to these wavelengths. A schematic representation of the transmission spectra of the three gratings is depicted in FIG. 2. When the gratings are ordered as shown in FIG. 1, (the shortest wavelength is reflected first, followed by the next longer wavelength and finally the longest wavelength is reflected by the three gratings) the wavelengths are correctly ordered such that no optical channel passes through the radiation mode loss regions of any of the gratings during the "drop" process. That is, when the three optical channels are reflected by the gratings toward port two of the first optical circulator, the longer wavelength channels pass through the long wavelength region of the first grating in which there is substantially complete transmission.

However, when channels 1, 2, and 3 are added, channel 3, the longest wavelength channel, is reflected first, followed by channels 2 and 1. Consequently, both channels 1 and 2 pass through the radiation mode loss region for channel 3 and channel 1 additionally passes through the radiation mode loss region for channel 2. Consequently, these channels suffer substantial attenuation as they pass through the radiation mode loss regions of other gratings.

There is a need in the art for gratings-based optical add-drop multiplexers which can add and drop plural optical channels. Such add-drop multiplexers could be used in dense WDM optical communication systems for routing of optical traffic among plural locations.

SUMMARY OF THE INVENTION

The present invention provides a gratings-based add-drop multiplexer in which plural optical channels can be added and/or dropped by the same optical device in a manner which avoids transmitting an optical channel through a radiation mode loss region of a Bragg grating. In one embodiment, the add-drop multiplexer comprises a three-port optical circulator. The first circulator port optically communicates with a first optical transmission path carrying a wavelength division multiplexed optical signal which includes one or more optical signals to be dropped from the transmission path.

A second optical transmission path optically communicates with the second circulator port. Positioned in the second optical transmission path is a set of one or more Bragg gratings configured to reflect one or more optical wavelengths included in the wavelength division multiplexed optical communication signal carried by the first optical transmission path. Reflected optical signals re-enter the second circulator port and are output onto a third "drop" optical transmission path which optically communicates with the third circulator port.

An optical coupler which includes first and second coupler input ports and one coupler output port is positioned such that the first coupler input port receives optical signals from the second optical transmission path which are transmitted through the set of Bragg gratings. A fourth optical transmission path optically communicates with the second coupler input port for to carrying optical wavelengths to be added to the optical signals from the second optical transmission path.

The coupler optically combines the sets of optical signals received by the first and second coupler input ports and outputs the combined optical signal onto a fifth optical transmission path optically communicating with the coupler output port. Advantageously, the optical signals added by the add-drop multiplexer are not reflected by the set of gratings which are used to drop optical channels, avoiding any problems with transmission through the radiation mode loss region of a grating. Further, because the "add" optical signals are not reflected by the gratings set, the add-drop multiplexer can be used asymmetrically, i.e., more optical channels can be added than are dropped.

DETAILED DESCRIPTION

Figure 3:
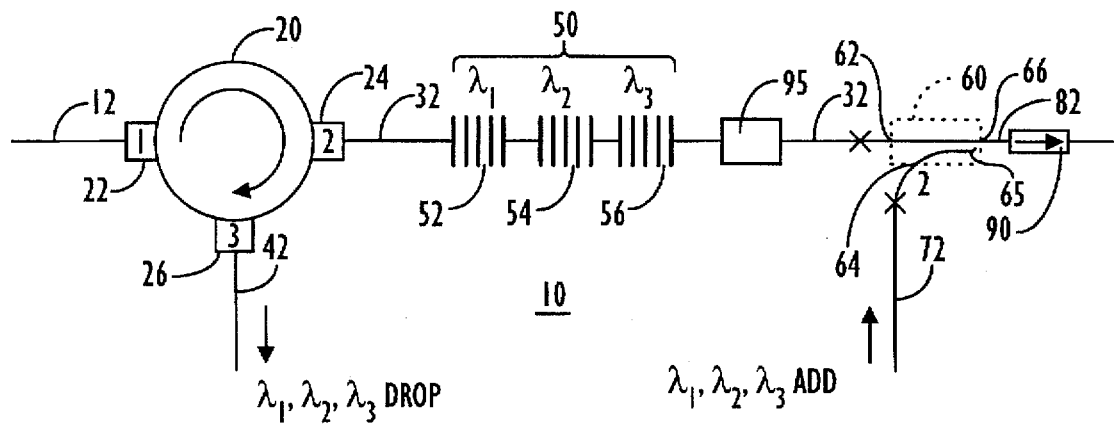
FIG. 3 schematically depicts an add-drop multiplexer according to an embodiment of the present invention.

Turning now to the drawings in detail, in which like numerals indicate the same or similar elements, FIG. 3 depicts an add-drop multiplexer 10 according to one embodiment of the present invention. Add-drop multiplexer 10 comprises an optical circulator 20 having first, second, and third optical circulator ports 22, 24, and 26, respectively. Optical circulator 20 is configured such that optical signals which enter circulator port 22 exit through circulator port 24 and optical signals which enter circulator port 24 exit through circulator port 26. A first optical transmission path 12 optically communicates with first circulator port 22. The expression "optically communicates" as used herein, refers to any connection, coupling, link, or the like, by which optical signals carried by one optical system element are imparted to the "communicating" element. Such "optically communicating" devices are not necessarily directly connected to one another, but may be separated by intermediate optical components or devices. In an exemplary embodiment, optical transmission path 12 is a singe mode optical fiber which forms the principal transmission medium for a wavelength division multiplexed optical communication system.

A second transmission path 32 optically communicates with second circulator port 24. Positioned within optical transmission path 32 are a set of one or more Bragg gratings 50. In the depicted add/drop multiplexer, three Bragg gratings, 52, 54, and 56, respectively corresponding to wavelengths of $\lambda_1$, $\lambda_2$, and $\lambda_3$ where $\lambda_1<\lambda_2<\lambda_3$ form the set of Bragg gratings 50. While three Bragg gratings are depicted in FIG. 3, it is understood that the set of optical gratings can be one grating up to plural optical gratings. Further, a single broad grating may be used to drop more than one optical channel.

Preferably, Bragg gratings 52, 54, and 56 comprise a series of photoinduced refractive index perturbations in an optical fiber which reflect optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8–14, the disclosure of which is incorporated by reference herein. However any high reflectivity Bragg grating can be employed in the set of Bragg gratings 50 in the add-drop multiplexer of FIG. 3.

In an exemplary embodiment when a broad grating is used in grating set 50, the grating is chirped. Advantageously, the grating is chirped is such a manner as to reflect the wavelengths in sequential order from shortest to longest wavelengths. Methods of fabricating chirped gratings are disclosed in Farries et al. *Electronics Letters*, Vol. 30, No. 11, 29 May 1995, pp. 891–892, the disclosure of which is incorporated by reference herein. When plural Bragg gratings are employed, the individual Bragg gratings can also be chirped gratings.

Although the set of gratings 50 is depicted as comprising fixed gratings, the add-drop multiplexer can be selected to be reconfigurable through the use of tunable optical filtering elements. For example, the gratings set 50 can be temperature tuned such that the reflection wavelength is shifted in or out of an optical channel band. In an exemplary embodiment, the out-of-band position is a wavelength band situated between adjacent optical channels. When the grating reflection wavelength is tuned to an optical channel band, the corresponding optical channel is dropped. When the grating reflection wavelength is tuned out of an optical channel band, the corresponding optical channel is a "through" channel, i.e., a channel which is transmitted unaffected through add-drop multiplexer 10. In another technique, the gratings are mechanically strained to shift the reflection wavelength in or out of optical channel bands. Alternatively, the gratings can be thermally or mechanically tuned to different optical channels. In this manner, control of either temperature or mechanical strain functions to create a reconfigurable add-drop multiplexer.

A third optical transmission path 42 optically communicates with third optical circulator port 26. Optical transmission path 42 receives optical signals which are reflected by the set of Bragg gratings 50 back towards second circulator port 24.

Optical coupler 60 is used to couple optical signals to be added to an optical transmission system. Optical coupler 60 is selected from any optical device which combines optical signals from plural input ports and places the combined optical signal onto an output port (with the remaining optical fiber terminated at 65). Typically, the optical signals from two input ports are equally combined and placed on the output path although the two input paths can be combined in various ratios (e.g., 70:30, 80:20, etc.) depending upon the needs of the optical system (e.g., when desiring to equalize signal strength from two optical paths). Exemplary optical couplers are 1×2 fused fiber optical splitters, commercially available from Corning and Gould, used to combine signals rather than split the signals. Optical coupler 60 includes first input port 62, second input port 64, and output port 66. First input port 62 optically communicates with optical transmission path 32 for receiving those optical signals output by optical circulator port 2 which are not dropped by grating set 50, i.e., the "through" optical signals.

A fourth optical transmission path 72 optically communicates with second coupler input port 64 for adding optical signals to the through optical signals received by first coupler input port 62. Because coupler 60 combines the optical signals from input ports 62 and 64, the optical signals which are added via transmission path 72 do not contact grating set 50 but are directly combined with the signals from first input port 62 and output through port 66. Consequently, an arbitrary number of optical channels may be added to the optical system; the wavelengths of the optical channels do not need to correspond to the wavelengths of the channels dropped by grating set 50.

A fifth optical transmission path 82 optically communicates with coupler output port 66 for receiving the combined optical signal from the first and second input ports. As with optical transmission path 12, optically transmission path 82 is typically a single mode optical fiber which forms the principal transmission medium of a WDM optical communication system.

Optionally an attenuation element 95 is positioned in optical path 32. Optical attenuation element 95 is used to equalize signal levels between the optical signals from optical path 32 and the optical signals from optical path 72. In an exemplary embodiment, optical attenuation element 95 is selected from high attenuation optical fiber, commercially available from AT&T/Lucent Technologies or build-out attenuators commercially from Amp. An optical isolator 90 is optionally positioned in optical transmission path 82 to prevent amplified spontaneous emission (ASE) from downstream amplifiers from entering coupler 60 through output port 66.

In an exemplary embodiment, the operation of add-drop multiplexer 10 is as follows. A wavelength division multiplexed optical signal having optical channels 1–8 propagates along optical transmission path 12 and enters circulator 20 through port 1. Channels 1–8 are output through circulator port 2 onto optical path 32. Optical channels 1–3 are respectively reflected by gratings 52, 54, and 56 back through circulator port 2 and output onto optical path 42 through circulator port 3. From optical path 42 they are routed to a demultiplexer system and optical receivers, or routed to another optical transmission path. Optical channels 4–8 are transmitted through grating set 50 and continue on path 32 to input port 62 of optical coupler 60.

Optical channels to be added, e.g., new optical channels 1–3 (using nominally the same signal wavelengths as dropped channels 1–3) or additional optical channels 9–12 or a combination thereof, are input to coupler port 64 from transmission path 72. Through optical channels 4–8 and new optical channels 1–3 are combined by coupler 60 and output through port 66 onto output path 82. This newly-created WDM optical signal continues propagation along the transmission path of the optical communication system.

Figure 4:
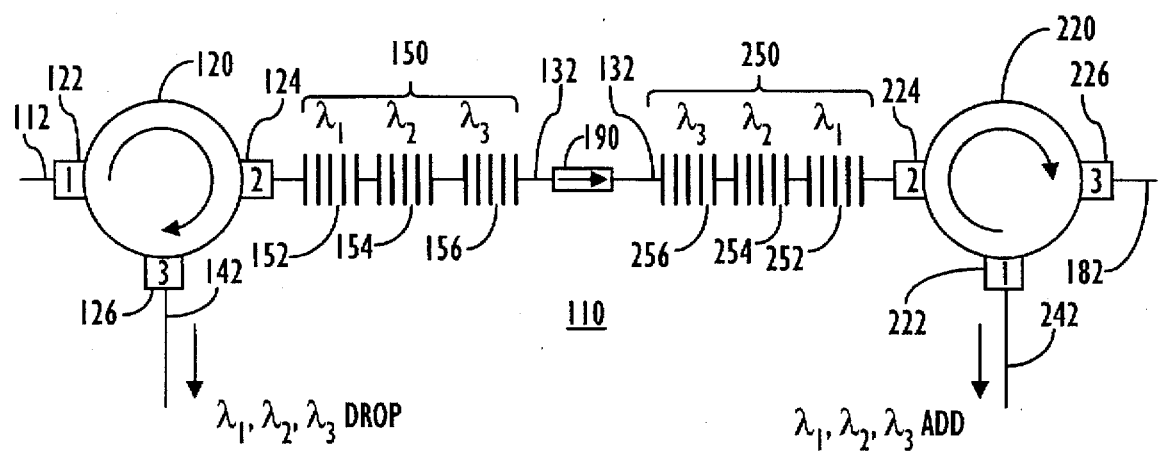
FIG. 4 schematically depicts an add-drop multiplexer according to a further embodiment of the present invention.

FIG. 4 depicts an add-drop multiplexer 110 according to a further embodiment of the present invention. Add-drop multiplexer 110 comprises a first three-port optical circulator 120 having first circulator port 122, second circulator port 124 and third circulator port 126, and a second three-port optical circulator 220 having first circulator port 222, second circulator port 224, and third circulator port 226. A first optical transmission path 112 optically communicates with first circulator port 122 for carrying a wavelength division multiplexed optical communication signal. A second optical transmission path 132 optically communicates with both the second port 124 of the first optical circulator and the second port 224 of the second optical circulator.

Figure 1:
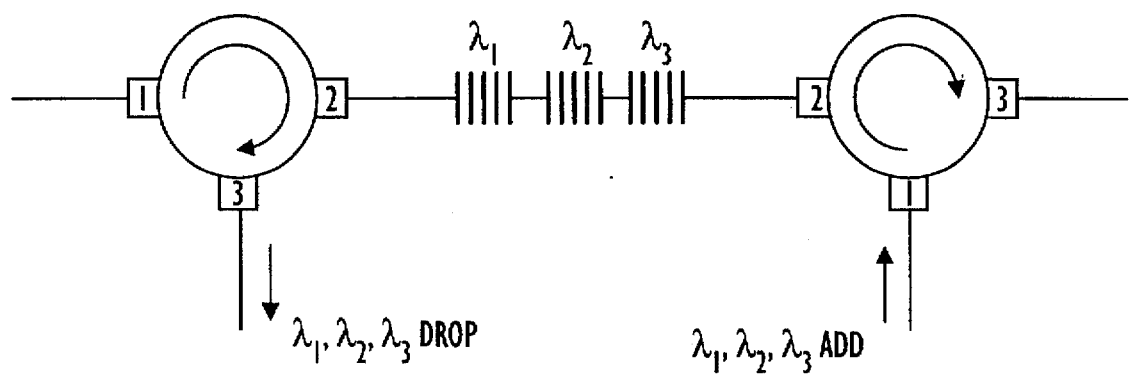
FIG. 1 schematically depicts an add-drop multiplexer comprising plural Bragg gratings positioned between optical circulators.
Figure 2:
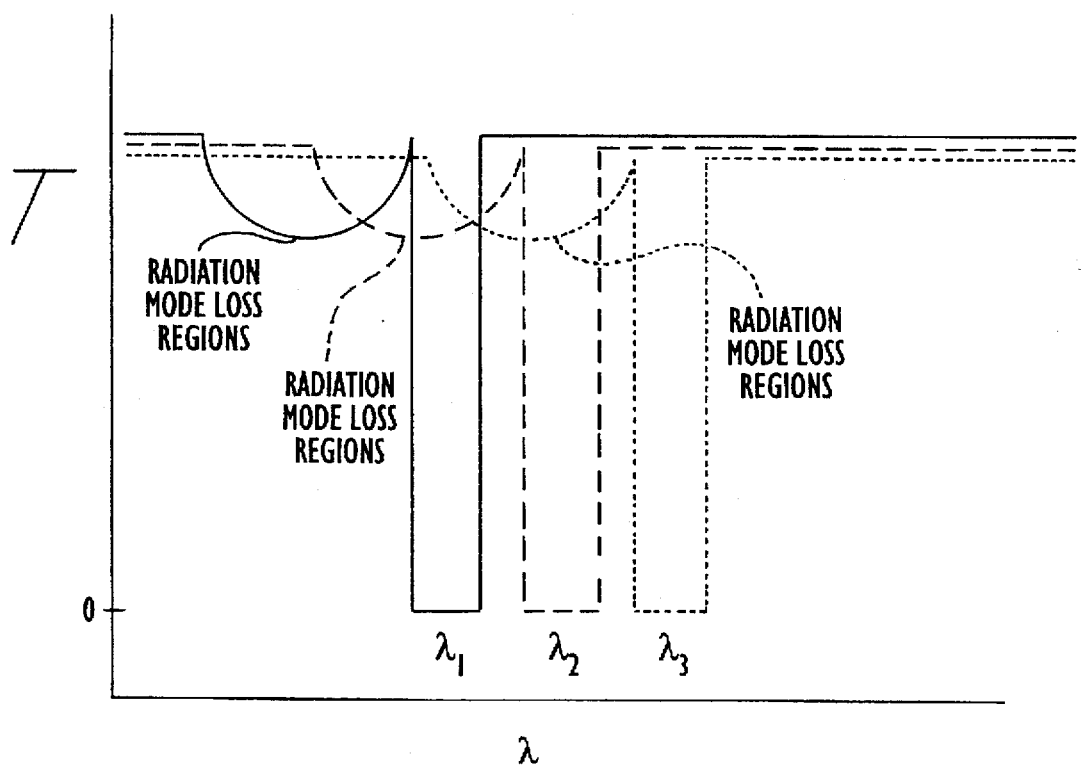
FIG. 2 schematically depicts an the transmission spectra of the Bragg gratings of the add-drop multiplexer of FIG. 1.

Positioned in second optical transmission path 132 are first and second sets of Bragg gratings, respectively 150 and 250, separated by optical isolator 190. As in the add-drop multiplexer of FIG. 1, Bragg grating set 150 includes gratings 152, 154, and 156 respectively corresponding to wavelengths of $\lambda_1$, $\lambda_2$, and $\lambda_3$ where $\lambda_1<\lambda_2<\lambda_3$. By ordering the gratings from shortest wavelength to longest wavelength, no optical channel is transmitted through the radiation mode loss region of a grating during transmission or reflection. As in the previous embodiment, one or more broad chirped gratings, configured to reflect wavelengths in an order from shortest to longest, can be used to reflect the optical channels to be dropped. Optical signals having these wavelengths are reflected back through port 2 of circulator 150 and output onto "drop" optical transmission path 142.

Bragg grating set 250 includes gratings 252, 254, and 256 also corresponding to wavelengths of $\lambda_1$, $\lambda_2$, and $\lambda_3$ where $\lambda_1<\lambda_2<\lambda_3$. Optical signals to be added to an optical system are carried by optical transmission path 242 into the first port 222 of the second optical circulator and encounter gratings set 250 when the signals are output onto transmission path 132 through the second port 224 of the second circulator. These "add" optical signals are reflected back towards circulator port 224 along with the through optical channels transmitted through first and second gratings sets 150 and 250. The combined optical signals are output through the third port 226 of optical circulator 220 onto optical transmission path 182. As with optical transmission path 112, optical transmission path 182 is typically a single mode optical fiber which forms the principal transmission medium for an optical communication system. As with the grating set 50 of the previous embodiment, one or more of the individually gratings can be thermally tunable or strain tunable such that the add-drop multiplexer is configurable to selectively add or drop particular optical channels. It is understood that the gratings sets 150 and 250 with three gratings each is an illustrative embodiment and that any number of gratings can be employed in gratings sets 150 and 250.

To prevent Fabry-Perot resonances between like gratings on either side of the isolator from leaked optical signals, an isolator 190 is positioned between gratings set 150 and gratings set 250. Isolator 190 permits optical signals to be unidirectional transmitted in the illustrated direction while optical signals propagating in the opposite direction are attenuated.

In an exemplary embodiment, operation of add-drop multiplexer 110 is as follows. A wavelength division multiplexed optical signal having optical channels 1–8 propagates along optical transmission path 112 and enters circulator 120 through first circulator port 122. Channels 1–8 are output through second circulator port 124 onto optical path 32. Optical channels 1–3 are respectively reflected by gratings 152, 154, and 156 back through second circulator port 124 and output onto drop optical path 142 through third circulator port 126. From optical path 142 they are routed to a demultiplexer system and optical receivers, or routed to another optical transmission path. Optical channels 4–8 are transmitted through grating set 150 and continue on path 132 through isolator 190.

Optical channels to be added, e.g., new optical channels 1–3 (using the nominally same signal wavelengths as dropped channels 1–3), are input to second optical circulator port 222 from add optical path 242. Optical channels 1–3 are respectively reflected by gratings 252, 254, and 256 back through circulator port 224, exiting the second optical circulator through port 226 onto transmission path 182. Through optical channels 4–8 are similarly passed through circulator port 224 and output onto transmission path 182 through third circulator port 226, forming a newly-created WDM optical signal comprising the add channels and the through channels. This newly-created WDM optical signal continues propagation along the transmission path of the optical communication system.

While the foregoing invention has been described in terms of the embodiments discussed above, numerous variations are possible. Accordingly, modifications and changes such as those suggested above, but not limited thereto, are considered to be within the scope of following claims.

What is claimed is:

1. An optical add-drop multiplexer for a wavelength division multiplexed optical communication system comprising:

an optical circulator having at least first, second, and third circulator ports configured such that optical signals which enter the first circulator port exit the circulator at the second circulator port and optical signals which enter the second circulator port exit the circulator at the third circulator port;

a first optical transmission path optically communicating with the first circulator port for carrying a wavelength division multiplexed optical signal which includes one or more optical signals to be dropped from the transmission path;

a second optical transmission path optically communicating with the second circulator port, the second optical transmission path having positioned therein a set of one or more Bragg gratings which is configured to reflect one or more optical wavelengths included in a wavelength division multiplexed optical communication signal carried by the first optical transmission path, the set of one or more gratings configured such that the wavelengths are reflected in an order from shortest wavelength to longest wavelength, the wavelengths being reflected towards the second circulator port to be output by the circulator through the third circulator port, the reflected wavelengths corresponding to optical channels to be dropped from a wavelength division multiplexed optical communication signal;

a third optical transmission path optically communicating with the third circulator port, the third optical transmission path configured to receive optical wavelengths output by the third circulator port corresponding to channels to be dropped from a wavelength division multiplexed optical communication signal;

an optical coupler having first and second coupler input ports and one coupler output port and configured such that optical signals which enter the first and second input port are combined and output to the coupler output port, the second optical transmission path optically communicating with the first coupler input port for transmitting a wavelength division multiplexed optical communication signal from the second optical transmission path to the first coupler input port;

a fourth optical transmission path optically communicating with the second coupler input port and configured to carry optical wavelengths to be added to through channels from the first optical transmission path;

a fifth optical transmission path optically communicating with the coupler output port for receiving the combined optical signals from the first coupler input port and the second coupler input port, the combined optical signals corresponding to a wavelength division multiplexed optical communication signal which includes the through channels from the first optical transmission path and the optical channels added from the fourth optical transmission path;

the coupler and the fourth optical transmission path being configured such that optical signals carried by the fourth optical path do not optically communicate with the second transmission path and the set of Bragg gratings positioned in the second transmission path.

2. An add-drop multiplexer for a wavelength division multiplexed optical communication system as recited in claim 1 in which the set of Bragg gratings includes one or more tunable Bragg gratings.

3. An add-drop multiplexer for a wavelength division multiplexed optical communication system as recited in claim 1 in set of Bragg gratings comprises one or more in-fiber Bragg gratings.

4. An add-drop multiplexer for a wavelength division multiplexed optical communication system as recited in claim 1 wherein the set of one or more Bragg gratings comprises a single chirped grating.

5. An add-drop multiplexer as recited in claim 1 further comprising an optical loss element positioned in the second optical transmission path downstream of the set of Bragg gratings.

6. An optical add-drop multiplexer for a wavelength division multiplexed optical communication system comprising:

a first optical circulator having at least first, second, and third circulator ports configured such that optical signals which enter the first circulator port exit the circulator at the second circulator port and optical signals which enter the second circulator port exit the circulator at the third circulator port;

a second optical circulator having at least first, second, and third circulator ports configured such that optical signals which enter the first circulator port exit the circulator at the second circulator port and optical signals which enter the second circulator port exit the circulator at the third circulator port, the second port of the second optical communication port;

a first optical transmission path optically communicating with the first port of the first optical circulator for carrying a wavelength division multiplexed optical signal which includes one or more optical signals to be dropped from the transmission path;

a second optical transmission path optically communicating with the second port of the first optical circulator and the second port of the second optical circulator, the second optical transmission path having positioned therein a first set of one or more Bragg gratings which is configured to reflect one or more optical wavelengths included in a wavelength division multiplexed optical communication signal carried by the first optical transmission path towards the second circulator port to be output by the circulator through the third circulator port, the reflected wavelengths corresponding to optical channels to be dropped from a wavelength division multiplexed optical communication signal, the second optical transmission path further having positioned therein an optical isolator downstream of the first set of Bragg gratings, and the second optical transmission path further having positioned therein a second set of one or more Bragg gratings located downstream of the optical isolator, the second set of one or more Bragg gratings configured to reflect one or more optical wavelengths to be added to an optical communication signal transmitted through the first set of Bragg gratings;

a third optical transmission path optically communicating with the third port of the first optical circulator, the third optical transmission path configured to receive optical wavelengths output by the third port of the first circulator corresponding to channels to be dropped from a wavelength division multiplexed optical communication signal;

a fourth optical transmission path optically communicating with the first port of the second optical circulator, the fourth optical transmission path configured to carry optical signals to be added to an optical signal transmitted through the first set of Bragg gratings, optical signals carried by the fourth optical transmission path being output through the second port of the second optical circulator and reflected by the second set of Bragg gratings; and a fifth optical transmission path optically communicating with the third port of the second optical circulator, the fifth optical transmission path configured to carry optical signals transmitted through the first set of Bragg gratings and optical signals reflected by the second set of Bragg gratings.

7. An add-drop multiplexer for a wavelength division multiplexed optical communication system as recited in claim 6 in which the first and second sets of Bragg ratings include one or more tunable Bragg gratings.

8. An add-drop multiplexer for a wavelength division multiplexed optical communication system as recited in claim 6 in which the first and second sets of Bragg gratings comprises one or more in-fiber Bragg gratings.

9. An add-drop multiplexer for a wavelength division multiplexed optical communication system as recited in claim 6 wherein the first set of one or more Bragg gratings is a single chirped grating.

10. An add-drop multiplexer for a wavelength division multiplexed optical communication system as recited in claim 6 wherein the second set of one or more Bragg gratings is a single chirped grating.

11. A method of add-drop multiplexing in a wavelength division multiplexed optical communication system comprising:

providing a first wavelength division multiplexed optical communication signal comprising one or more optical channels to be dropped to the first port of an optical circulator having at least circulator ports;

outputting the wavelength division multiplexed optical signal onto an intermediate optical transmission path having positioned therein a set of one or more Bragg gratings for reflecting one or more optical channels towards the second port of the optical circulator, the set of one or more Bragg gratings configured such that the wavelengths to be dropped are reflected in an order from shortest wavelength to longest wavelength;

dropping a first quantity of one or more optical channels with the set of Bragg gratings through a drop optical transmission path optically communicating with the third circulator port to form a second optical signal comprising the remaining optical channels of the first wavelength division multiplexed optical communication signal;

providing an optical coupler having a first input port optically communicating with the intermediate optical path for receiving the second optical signal and having a second input port optically communicating with an add transmission path;

supplying a second number of one or more optical channels to the add transmission path and inputting the second number of one or more optical channels to the second coupler input port such that the second number of optical channels do not optically communicate with the set of Bragg gratings;

combining the second optical signal and the second number of optical channels in the coupler to form a second wavelength multiplexed optical communication signal;

outputting the second wavelength division multiplexed optical communication signal to a coupler output port.

12. A method of add-drop multiplexing in a wavelength division multiplexed optical communication system as recited in claim 11 in which the first number of optical channels is smaller than the second number of optical channels.

13. A method of add-drop multiplexing in a wavelength division multiplexed optical communication system as recited in claim 11 in which the first number of optical channels is larger than the second number of optical channels.

* * * * *